(12) United States Patent
Weinenger et al.

(10) Patent No.: US 10,584,659 B2
(45) Date of Patent: Mar. 10, 2020

(54) ROBUST, LIGHTWEIGHT, LOW COMPRESSION HEIGHT PISTON AND METHOD OF CONSTRUCTION THEREOF

(71) Applicant: Federal-Mogul Corporation, Southfield, MI (US)

(72) Inventors: Michael Weinenger, Southfield, MI (US); Jeffrey L. Riffe, Troy, MI (US); Miguel Azevedo, Ann Arbor, MI (US)

(73) Assignee: Tenneco Inc, Lake Forest, IL (US)

( * ) Notice: Subject to any disclaimer, the term of this patent is extended or adjusted under 35 U.S.C. 154(b) by 560 days.

(21) Appl. No.: 15/077,168

(22) Filed: Mar. 22, 2016

(65) Prior Publication Data

US 2016/0281635 A1      Sep. 29, 2016

Related U.S. Application Data

(60) Provisional application No. 62/136,948, filed on Mar. 23, 2015.

(51) Int. Cl.
*F02F 3/26* (2006.01)
*F02F 3/22* (2006.01)
(Continued)

(52) U.S. Cl.
CPC .................. *F02F 3/26* (2013.01); *B21K 1/18* (2013.01); *B22D 15/02* (2013.01); *B22D 25/02* (2013.01);
(Continued)

(58) Field of Classification Search
CPC .. F02F 2200/06; F02F 2003/0007; F02F 3/22; B21K 1/18; B33Y 10/00; B33Y 80/00
See application file for complete search history.

(56) References Cited

U.S. PATENT DOCUMENTS

| 2,153,501 A | 4/1939 | Harper, Jr. |
| 3,516,335 A | 6/1970 | Fangman |

(Continued)

FOREIGN PATENT DOCUMENTS

| CN | 2623891 Y | 7/2004 |
| CN | 102959222 A | 3/2013 |

(Continued)

OTHER PUBLICATIONS

International Search Report, dated Jun. 14, 2016 (PCT/US2016/023653).

*Primary Examiner* — Kevin A Lathers
(74) *Attorney, Agent, or Firm* — Robert L. Stearns; Dickinson Wright, PLLC

(57) ABSTRACT

A piston for an internal combustion engine and method of construction is provided. The piston has a robust, lightweight monolithic piston body including an upper wall forming a combustion bowl depending radially inwardly from an annular, uppermost combustion surface. An undercrown surface is formed on an underside of the combustion bowl, with at least a portion of the undercrown surface being bounded by diametrically opposite skirt portions, pin bosses and strut portions connecting the skirt portions to the pin bosses. The bounded undercrown surface has an openly exposed surface area, as viewed looking along a central longitudinal axis along which the piston reciprocates, providing an expansive area against which oil being splashed or sprayed can come into direct contact with to enhance cooling the piston while in use. Through channels extending over upper regions of the pin bosses can be provided to further reduce weight and facilitate cooling.

25 Claims, 5 Drawing Sheets

(51) Int. Cl.
*B33Y 10/00* (2015.01)
*B33Y 80/00* (2015.01)
*B21K 1/18* (2006.01)
*B22D 15/02* (2006.01)
*B22D 25/02* (2006.01)
*F02F 3/00* (2006.01)

(52) U.S. Cl.
CPC .............. *B33Y 10/00* (2014.12); *B33Y 80/00* (2014.12); *F02F 3/22* (2013.01); *F02F 2003/0007* (2013.01); *F02F 2200/06* (2013.01)

(56) References Cited

U.S. PATENT DOCUMENTS

| | | | |
|---|---|---|---|
| 4,161,165 A | | 7/1979 | Belush et al. |
| 4,253,429 A | | 3/1981 | Galli |
| 5,845,611 A | * | 12/1998 | Schmidt .................. F02F 3/22 123/41.35 |
| 6,698,392 B1 | | 3/2004 | Koehnert et al. |
| 7,143,685 B2 | | 12/2006 | Zhu et al. |
| 7,472,674 B2 | | 1/2009 | Robelet |
| 7,997,249 B2 | | 8/2011 | Matsui et al. |
| 2006/0037471 A1 | | 2/2006 | Zhu et al. |
| 2008/0011262 A1 | * | 1/2008 | Scharp .................. F02F 3/0023 123/193.6 |
| 2011/0120299 A1 | * | 5/2011 | Aro .......................... B22C 9/105 92/186 |
| 2012/0037112 A1 | * | 2/2012 | Muscas .................. F02F 3/003 123/193.6 |
| 2013/0092116 A1 | | 4/2013 | Teshima et al. |
| 2013/0233270 A1 | | 9/2013 | Brandt et al. |
| 2016/0115899 A1 | | 4/2016 | Riffe et al. |
| 2016/0123274 A1 | | 5/2016 | Miller et al. |

FOREIGN PATENT DOCUMENTS

| | | |
|---|---|---|
| CN | 104246192 A | 12/2014 |
| DE | 2425881 A1 | 12/1975 |
| DE | 102005037740 B3 | 12/2006 |
| EP | 0 364 810 | 4/1990 |
| JP | S53154907 U | 12/1978 |
| JP | S59168557 U | 11/1984 |
| JP | 2004285942 A | 10/2004 |
| JP | 2006214298 A | 8/2006 |
| JP | 2008507657 A | 3/2008 |
| WO | 2012001887 A1 | 1/2012 |

* cited by examiner

US 10,584,659 B2

ROBUST, LIGHTWEIGHT, LOW COMPRESSION HEIGHT PISTON AND METHOD OF CONSTRUCTION THEREOF

CROSS-REFERENCE TO RELATED APPLICATION

This application claims the benefit of U.S. Provisional Application Ser. No. 62/136,948, filed Mar. 23, 2015, which is incorporated herein by reference in its entirety.

BACKGROUND OF THE INVENTION

1. Technical Field

This invention relates generally to internal combustion engines and more particularly to pistons therefor.

2. Related Art

Engine manufacturers are encountering increasing demands to improve engine efficiencies and performance, including, but not limited to, improving fuel economy, reducing oil consumption, improving fuel systems, increasing compression loads and operating temperature within the cylinder bores, reducing heat loss through the piston, improving lubrication of component parts, decreasing engine weight and making engines more compact, while at the same time decreasing the costs associated with manufacture. While desirable to increase the compression load and operation temperature within the combustion chamber, achieving these goals comes with a tradeoff in that it remains necessary to maintain the structural integrity and temperature of the piston within workable limits, and thus, these desirable "increases" limit the degree to which the piston compression height, and thus, overall piston size and mass can be decreased. This is particularly troublesome with typical piston constructions having an annular cooling gallery, including a closed or substantially closed annular cooling gallery, often viewed as necessary to maintain the operating temperature of the piston within workable limits. Further, the cost to manufacture pistons having upper and lower parts joined together along a bond joint to form the annular cooling gallery is generally increased due to the processes used to bond the upper and lower parts together, including joining and finish machining processes.

A piston constructed in accordance with this invention attains the desired benefits, including, amongst others, being robust, lightweight, having a reduced envelop and compression height, while at the same time overcoming the aforementioned disadvantages of known piston constructions and other disadvantages, as will become apparent to those skilled in the art upon reading the disclosure and viewing the drawings herein.

SUMMARY OF THE INVENTION

A piston constructed in accordance with this invention is constructed as a single monolithic piece of steel, thereby providing the piston with enhanced strength and durability to withstand increased compression loads and temperatures within a cylinder bore, such as those loads and temperatures encountered in modern high performance engines. Further, due to the novel single piece configuration of the piston, the cost associated with the manufacture of the piston is reduced in that the typical processes used to join piston upper and lower parts together are not employed. Further, in a piston constructed in accordance with the invention, the envelope, including the compression height (CH, defined as the distance extending between a pin bore axis and an upper crown combustion surface) and weight of the piston are able to be significantly reduced in comparison to a piston including an annular, closed or substantially closed cooling gallery, particularly since the piston does away with the presence of an annular cooling gallery and the typical annular floor commonly used to bound the lower surface of the closed cooling gallery section extending generally parallel to the pin bore axis between opposite pin bosses. As such, an engine in which pistons, constructed in accordance with the invention, are deployed can be made more compact, lightweight and fuel efficient. Further yet, in a piston constructed in accordance with the invention, an ability to direct oil directly from oil nozzles of the engine directly onto and against an undercrown surface is enhanced due to the presence of an openly exposed undercrown surface area extending generally between the pin bosses, as viewed looking at the bottom of the piston generally along a longitudinal central axis. Further yet, a piston constructed in accordance with the invention results in a reduction of the unit loading between a wrist pin and the bearing surface of the pin bores, as well as between the wrist pin and the bearing surface extending through a small end of a connecting rod, while at the same time providing an ability for increased pin joint lubrication. In addition, a piston constructed in accordance with the invention exhibits a desired increase in skirt deformation and a decreased cylinder liner deformation, thus, resulting in optimal piston ring performance and less engine oil "blow by" (term well known in the art as combustion gasses passing by the compression rings). And further yet, a piston constructed in accordance with the invention exhibits an enhanced ability to cool a ring belt region of the piston, given the constant, fresh supply of oil being directed against the openly exposed undercrown region immediately adjacent the ring belt region, further enhancing the ability of the piston rings to perform as intended over an extended useful life.

In accordance with one aspect of the invention, a first robust, lightweight piston for an internal combustion engine is provided. The piston has a monolithic piston body extending along a central longitudinal axis along which the piston reciprocates in a cylinder bore of an internal combustion engine. The piston body has an upper wall forming an upper combustion surface with an annular ring belt region depending from the upper combustion surface for receipt of at least one piston ring. The piston body further includes a pair of skirt portions depending from the ring belt region to facilitate guiding the piston within a cylinder bore, and a pair of pin bosses providing a pair of laterally spaced pin bores aligned along a pin bore axis for receipt of a wrist pin, wherein the pin bosses are joined to the skirt portions via strut portions. The upper combustion surface has first and second portions, with the first portion extending annularly along an outer periphery of the upper wall and the second portion forming a combustion bowl depending radially inwardly from the first portion. The upper wall has an undercrown surface formed on an underside of the combustion bowl directly opposite the second portion of the upper combustion surface. At least a portion of the undercrown surface, which is bounded by the skirt portions, the strut portions and the pin bosses, has an openly exposed projected 2-dimensional surface area, as viewed looking along the central longitudinal axis, between about 30-55 percent of an area defined by a maximum outer diameter (taking into account the body may not be perfectly round or circular) of the piston body, thereby providing an expansive area against which oil being splashed or sprayed can freely come into direct contact therewith to enhance cooling the piston while in use.

In accordance with another aspect of the invention, the undercrown surface bounded by the skirt portions, the strut portions and the pin bosses has a total 3-dimensional surface area (surface area following the undulating contour of the undercrown surface) that is greater than 30 percent of the maximum area of the piston body defined by the maximum outer diameter of the piston body.

In accordance with another aspect of the invention, the piston body can be provided having diametrically opposite, peripherally enclosed through channels extending over upper surfaces of the pin bosses and beneath the upper wall, wherein the through channels open into the openly exposed undercrown surface bounded by the skirt portions, the strut portions and the pin bosses to further facilitate cooling the piston body and reducing the weight thereof.

In accordance with another aspect of the invention, the through channels can have a non-circular shape, contoured to follow immediately adjacent features, as viewed in axial cross-section, thereby allowing the inner wall of the through channel to follow the contour of the adjacent combustion bowl and ring belt region, and thus, further facilitating forming an optimal wall thickness between the through channel and the combustion bowl, as well as the wall between the through channel and the ring belt region, which in turn maximizes the ability to reduce weight and facilitate cooling.

In accordance with another aspect of the invention, the through channels have an asymmetrical shape as viewed in axial cross-section, thereby further facilitating weight reduction and cooling.

In accordance with another aspect of the invention, the outer peripheries of the skirt portions, the strut portions and the pin bosses extend between about 75-100 percent of the outer circumference of the upper combustion surface.

In accordance with another aspect of the invention, a second robust, lightweight piston for an internal combustion engine is provided. The piston has a monolithic piston body extending along a central longitudinal axis along which the piston reciprocates in a cylinder bore of an internal combustion engine. The piston body has an upper wall forming an upper combustion surface with an annular ring belt region depending from the upper combustion surface for receipt of at least one piston ring. The piston body further includes a pair of skirt portions depending from the ring belt region to facilitate guiding the piston within a cylinder bore, and a pair of pin bosses providing a pair of laterally spaced pin bores aligned along a pin bore axis for receipt of a wrist pin, wherein the pin bosses are joined to the skirt portions via strut portions. The upper combustion surface has first and second portions, with the first portion extending annularly along an outer periphery of the upper wall and the second portion forming a combustion bowl depending radially inwardly from the first portion. The upper wall has an undercrown surface formed on an underside of the combustion bowl directly opposite the second portion of the upper combustion surface, wherein the undercrown surface, bounded by the skirt portions, the strut portions and the pin bosses, is openly exposed as viewed looking along the central longitudinal axis. The piston body further includes diametrically opposite, peripherally enclosed through channels extending over upper surfaces of the pin bosses and beneath the upper wall, wherein the through channels open into the openly exposed undercrown surface bounded by the skirt portions, the strut portions and the pin bosses.

In accordance with another aspect of the invention, the through channels can have a non-circular shape, contoured to follow immediately adjacent features, as viewed in axial cross-section.

In accordance with another aspect of the invention, the through channels have an asymmetrical shape as viewed in axial cross-section.

In accordance with another aspect of the invention, the undercrown surface bounded by the skirt portions, the strut portions and the pin bosses has an openly exposed projected 2-dimensional surface area, as viewed looking along the central longitudinal axis, between about 30-55 percent of an area defined by a maximum outer diameter of the piston body, thereby providing an expansive area against which oil being splashed or sprayed can freely come into direct contact therewith to enhance cooling the piston while in use.

In accordance with another aspect of the invention, the undercrown surface bounded by the skirt portions, the strut portions and the pin bosses has a total 3-dimensional surface area that is greater than 30 percent of the maximum area of the piston body defined by the maximum outer diameter of the piston body.

In accordance with another aspect of the invention, the outer peripheries of the skirt portions, the strut portions and the pin bosses extend between about 75-100 percent of the outer circumference of the upper combustion surface.

In accordance with another aspect of the invention, a method of constructing a galleryless piston for an internal combustion engine is provided. The method includes forming a monolithic piston body in one of a machining, forging, additive manufacturing (including 3-D printing) or casting process, with the piston body having an upper wall with an upper combustion surface and an annular ring belt region depending from the upper combustion surface. The method includes forming the upper combustion surface having first and second portions, with the first portion extending annularly along an outer periphery of the upper wall and the second portion forming a combustion bowl depending from the first portion. The method further includes forming the upper wall having an undercrown surface on an underside of the combustion bowl directly opposite the second portion. Further, forming at least a portion of the undercrown surface, bounded by diametrically opposite skirt portions, pin bosses, and strut portions extending between the skirt portions and pin bosses, having an openly exposed projected 2-dimensional surface area, as viewed looking along the central longitudinal axis, between about 30-55 percent of an area defined by a maximum outer diameter of the piston body, thereby providing an expansive area against which oil being splashed or sprayed can freely come into direct contact therewith to enhance cooling the piston while in use.

In accordance with another aspect of the invention, the method can include forming the undercrown surface, bounded by the skirt portions, the strut portions and the pin bosses, having a total 3-dimensional surface area that is greater than 30 percent of the maximum area of the piston body defined by the maximum outer diameter of the piston body.

In accordance with another aspect of the invention, the method can include forming the piston body having diametrically opposite, peripherally enclosed through channels extending over upper surfaces of the pin bosses and beneath the upper wall, with the through channels opening into the openly exposed undercrown surface bounded by the skirt portions, the strut portions and the pin bosses.

In accordance with another aspect of the invention, the method can include forming the through channels in a casting process.

In accordance with another aspect of the invention, the method can include casting the through channels having a non-circular shape as viewed in cross-section.

In accordance with another aspect of the invention, the method can include casting the through channels having an asymmetrical shape as viewed in cross-section.

In accordance with another aspect of the invention, the method can include forming the outer peripheries of the skirt portions, the strut portions and the pin bosses extending between about 75-100 percent of the outer circumference of the upper combustion surface.

In accordance with another aspect of the invention, a method of constructing a galleryless piston for an internal combustion engine is provided. The method includes forming a monolithic piston body in one of a machining, forging, additive manufacturing (including 3-D printing, amongst other additive manufacturing processes) or casting process, with the piston body having an upper wall with an upper combustion surface and an annular ring belt region depending from the upper combustion surface. The method includes forming the upper combustion surface having first and second portions, with the first portion extending annularly along an outer periphery of the upper wall and the second portion forming a combustion bowl depending from the first portion. The method further includes forming the upper wall having an undercrown surface on an underside of the combustion bowl directly opposite the second portion. Further, forming at least a portion of the undercrown surface, bounded by diametrically opposite skirt portions, pin bosses, and strut portions extending between the skirt portions and pin bosses, being openly exposed, as viewed looking along the central longitudinal axis, and forming the piston body having diametrically opposite, peripherally enclosed through channels extending over upper surfaces of the pin bosses and beneath the upper wall, with the through channels opening at opposite sides of the pin bosses into the openly exposed undercrown surface bounded by the skirt portions, the strut portions and the pin bosses.

In accordance with another aspect of the invention, the method can include forming the undercrown surface, bounded by the skirt portions, the strut portions and the pin bosses, having between about 30-55 percent of an area defined by a maximum outer diameter of the piston body, thereby providing an expansive area against which oil being splashed or sprayed can freely come into direct contact therewith to enhance cooling the piston while in use.

In accordance with another aspect of the invention, the method can include forming the undercrown surface, bounded by the skirt portions, the strut portions and the pin bosses, having a total 3-dimensional surface area that is greater than 30 percent of the maximum area of the piston body defined by the maximum outer diameter of the piston body.

In accordance with another aspect of the invention, the method can include forming the through channels extending over the pin bosses in a casting process.

In accordance with another aspect of the invention, the method can include casting the through channels extending over the pin bosses having a non-circular shape as viewed in cross-section.

In accordance with another aspect of the invention, the method can include casting the through channels extending over the pin bosses having an asymmetrical shape as viewed in cross-section.

In accordance with another aspect of the invention, the method can include forming the outer peripheries of the skirt portions, the strut portions and the pin bosses extending between about 75-100 percent of the outer circumference of the upper combustion surface.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
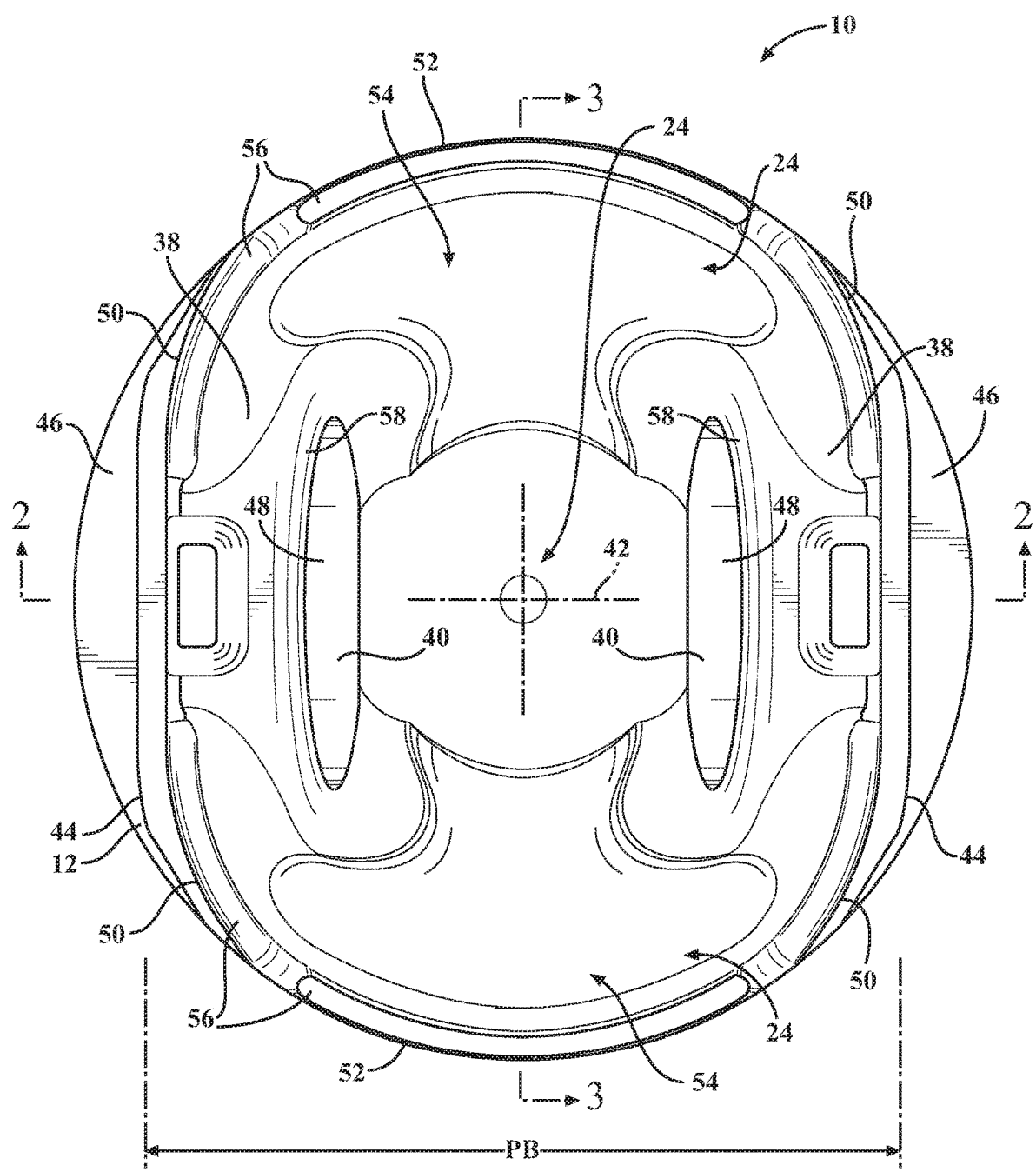
FIG. 1 is a bottom view of a piston constructed in accordance with one aspect of the invention.
Figure 2:
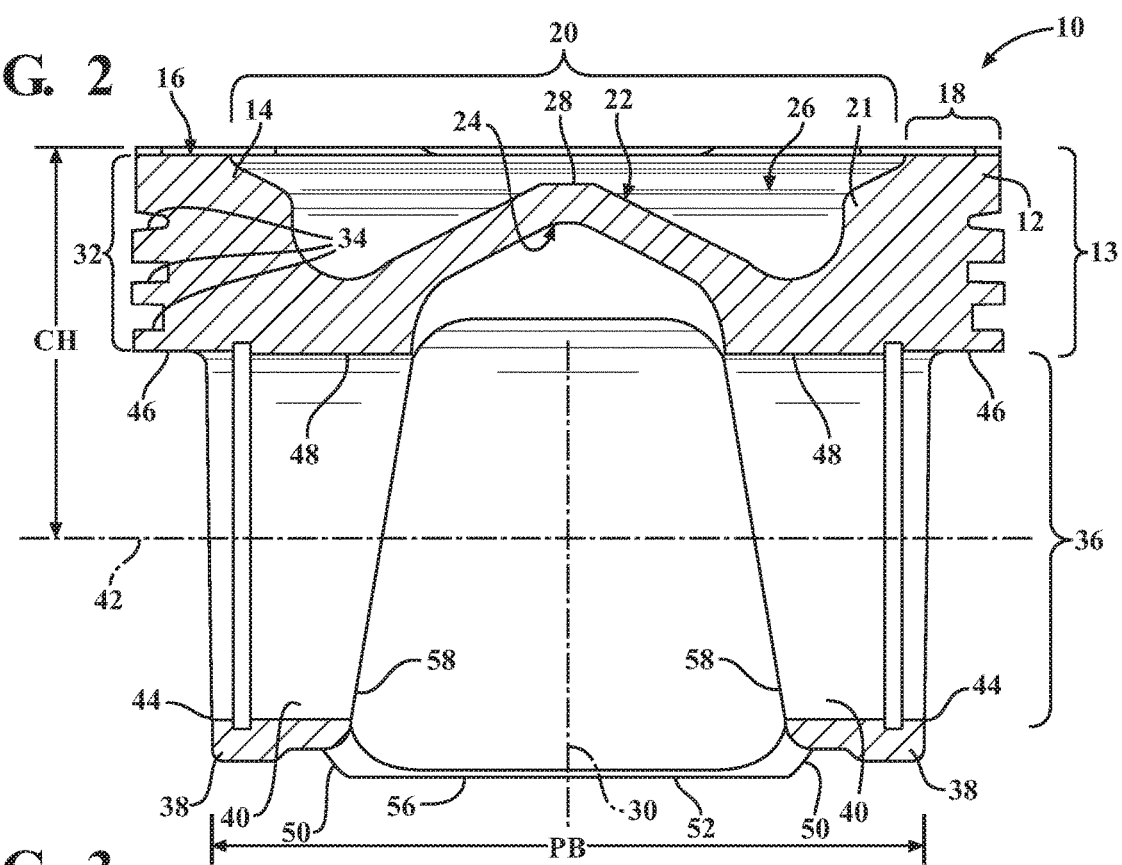
FIG. 2 is a cross-sectional view taken generally along the line 2-2 of FIG. 1, which extends generally along a central pin bore axis.
Figure 3:
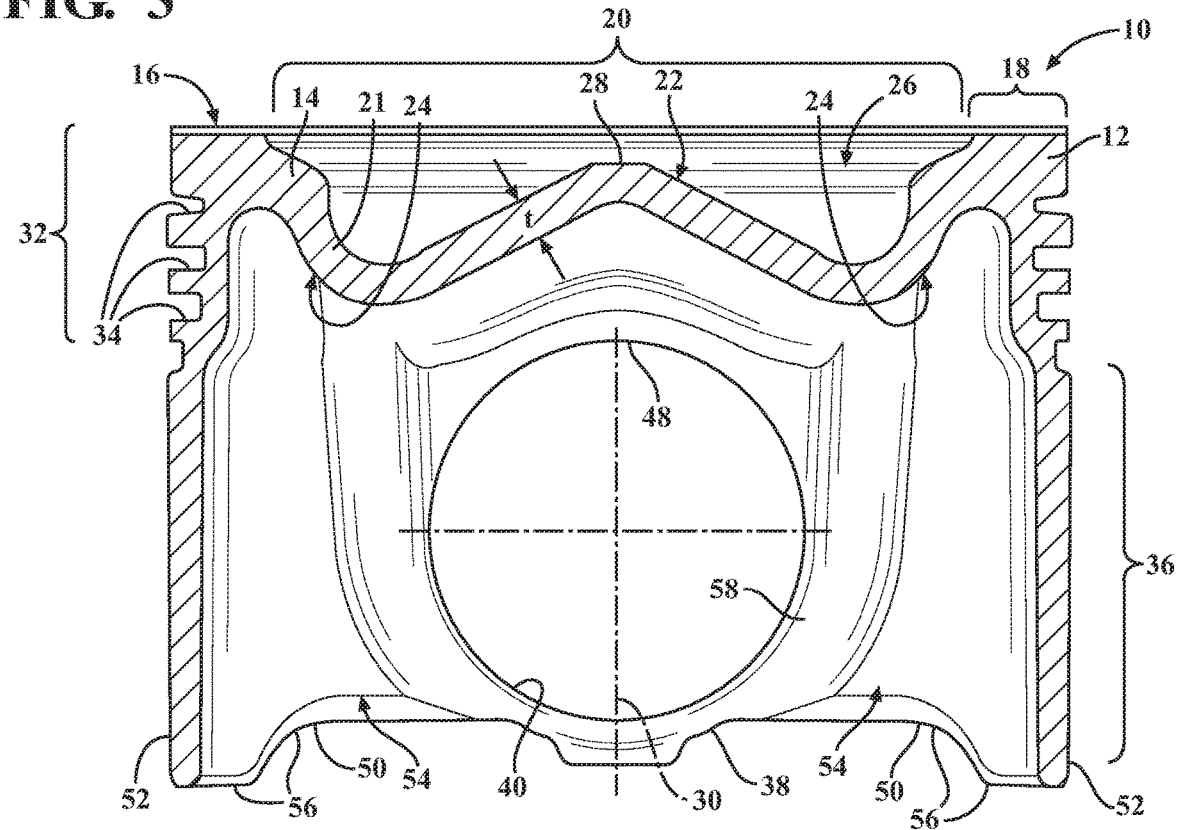
FIG. 3 is a cross-sectional view taken generally along the line 3-3 of FIG. 1, which extends generally transversely to the pin bore axis.
Figure 4:
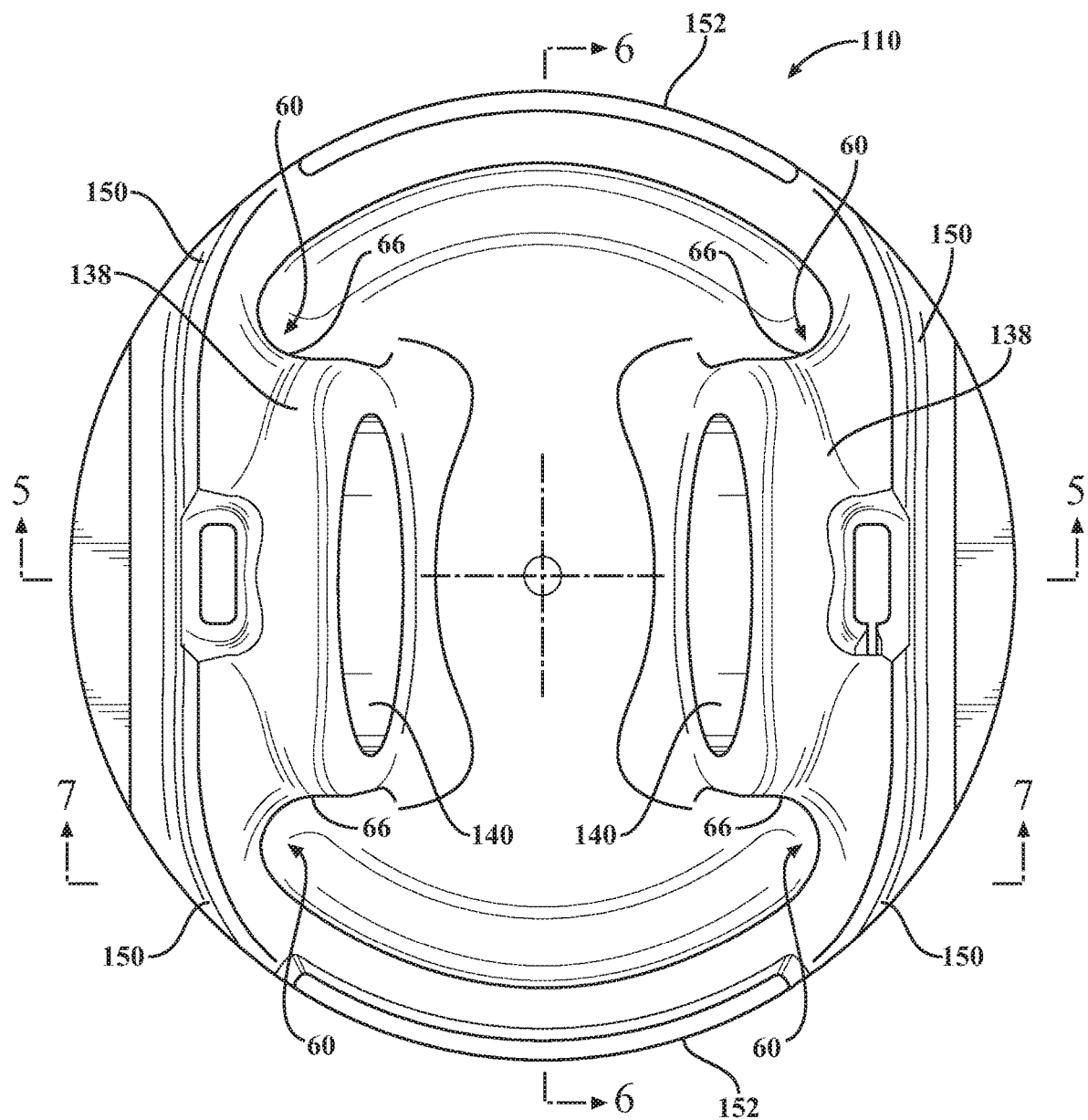
FIG. 4 is a bottom view of a piston constructed in accordance with another aspect of the invention.
Figure 5:
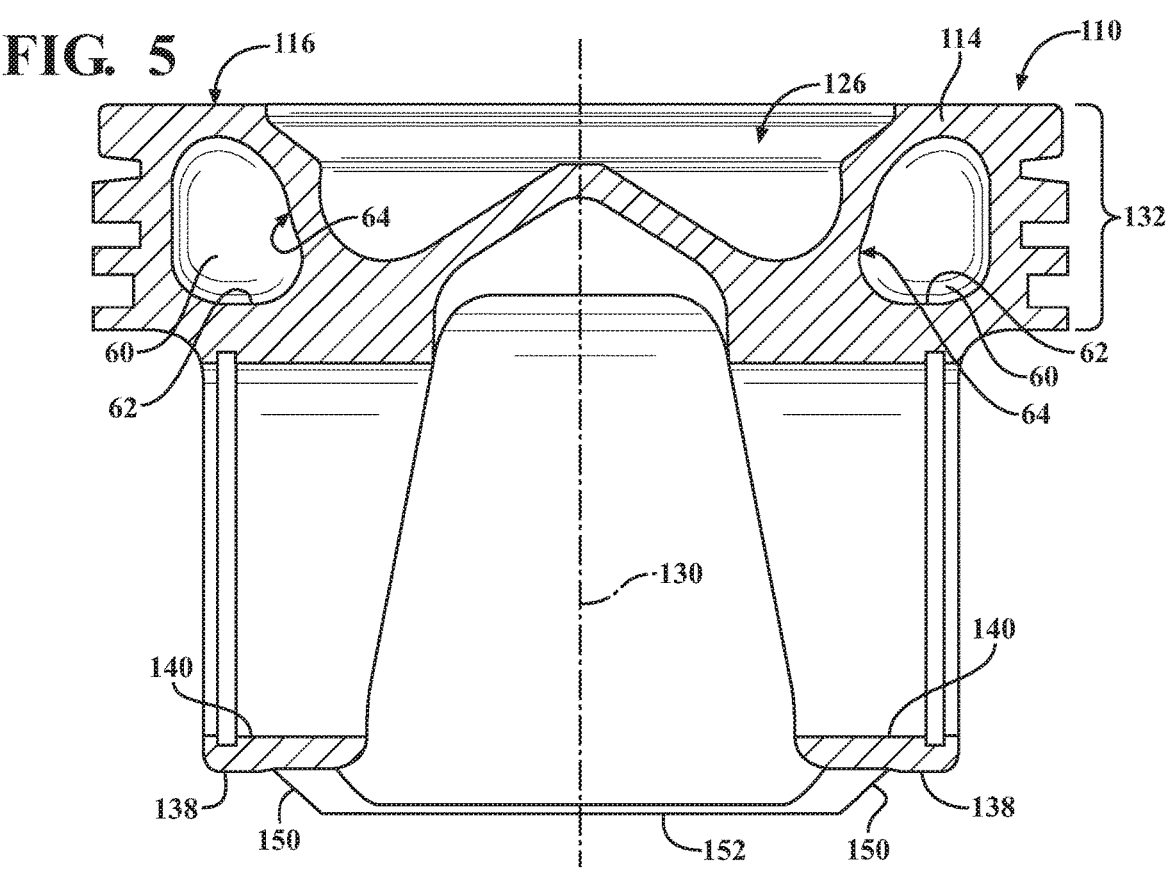
FIG. 5 is a cross-sectional view taken generally along the line 5-5 of FIG. 4, which extends generally along a central pin bore axis.
Figure 6:
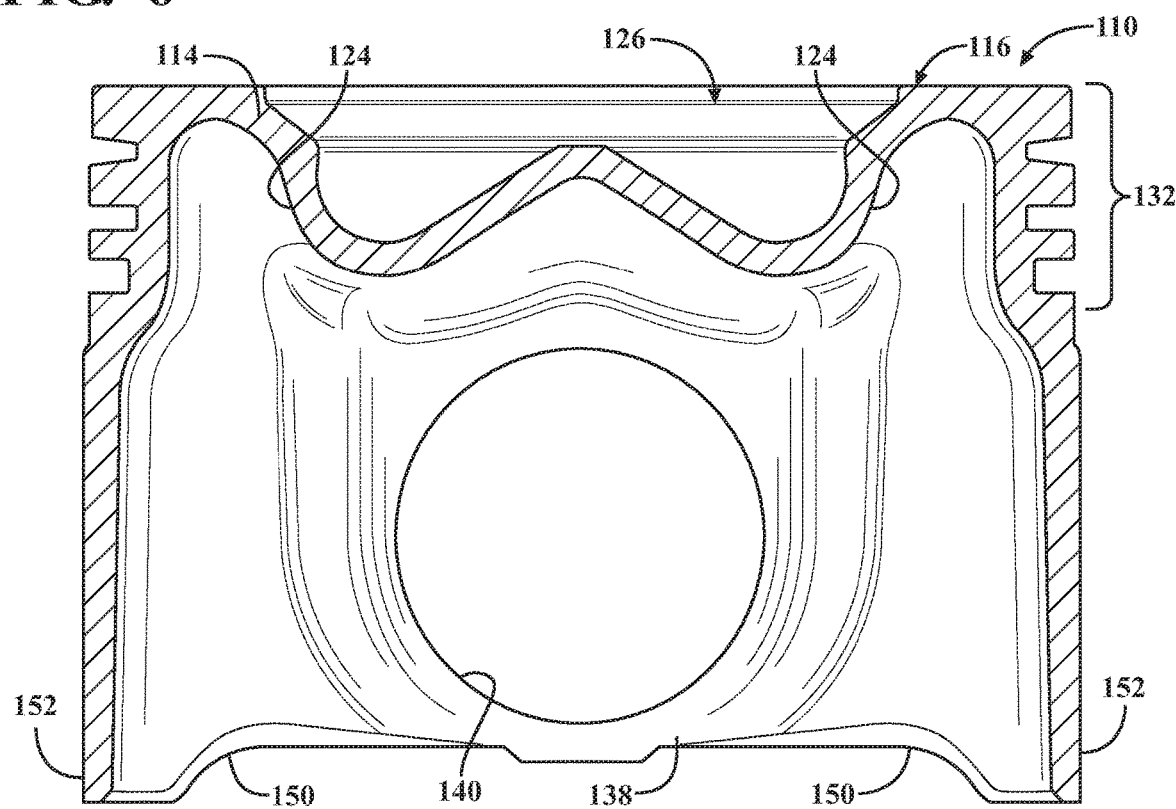
FIG. 6 is a cross-sectional view taken generally along the line 6-6 of FIG. 4, which extends generally transversely to the pin bore axis.
Figure 7:
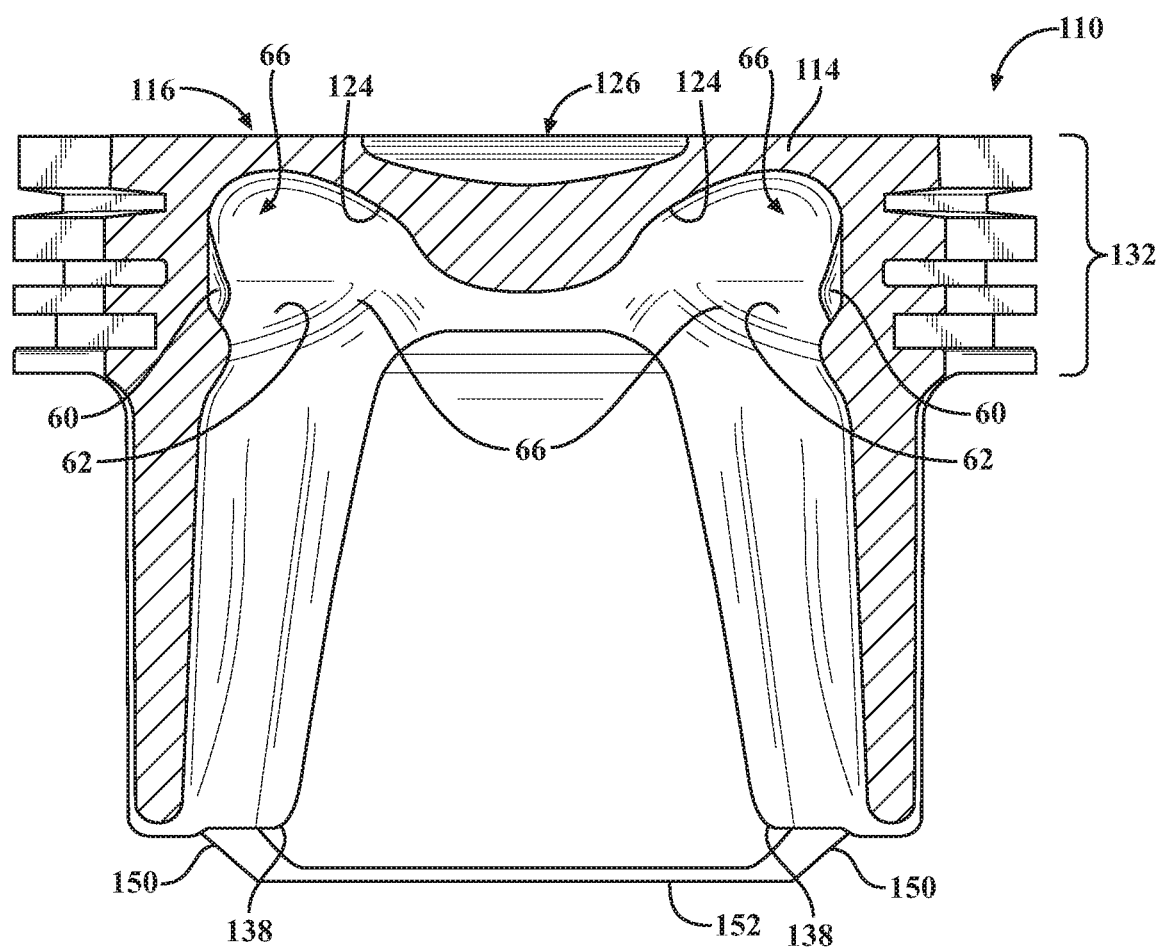
FIG. 7 is a cross-sectional view taken generally along the line 7-7 of FIG. 4.

Referring in more detail to the drawings, FIGS. 1-3 illustrate views of a piston 10 constructed in accordance with one presently preferred embodiment of the invention for reciprocating movement in a cylinder bore or chamber (not shown) of an internal combustion engine, such as a modern, compact, high performance vehicle engine, for example. The piston 10 is constructed having a monolithic body 12 formed from and/or as a single piece of material, such as via machining, forging, additive manufacturing processes (including but not limited to 3-D printing) or casting, with possible finish machining processes performed thereafter, as desired, to complete construction. Accordingly, the piston 10 does not have a plurality of parts joined together, such as upper and lower parts joined to one another, which is commonplace with pistons having enclosed or partially enclosed annular cooling galleries bounded or partially bounded by a cooling gallery floor. To the contrary, the piston 10 of FIGS. 1-3 is "galleryless" in that it does not have any presence of a cooling gallery floor or other features bounding or partially bounding a cooling gallery. The piston body 12, being made of steel, is robust, strong and durable to meet the high performance demands, i.e. increased temperature and compression loads, of modern day high performance internal combustion engines. The steel (i.e., the steel alloy) used to construct the body 12 can be SAE 4140 grade or different, depending on the requirements of the piston 10 in the particular engine application. Due in part to the piston 10 being galleryless, and others features discussed below, the novel configuration of the body 12, among other things discussed below, minimizes the outer envelope, weight and compression height (CH) of the piston 10, thereby allowing an engine in which the pistons 10 are deployed to achieve a reduced weight and to be made more compact. Further yet, even though being galleryless, the novel construction discussed herein and shown in the figures allows the piston 10 to be sufficiently and optimally cooled during use to withstand the most severe operating temperatures encountered in high performance engine applications.

The piston body 12 has an upper head or top section 13 with a top wall, also referred to as upper wall 14, which provides an upper combustion surface 16 that is directly exposed to extreme temperature and pressure combustion gasses within the cylinder bore of the internal combustion engine. The upper combustion surface 16 includes an annular first portion 18 formed as a substantially planar surface extending along an outer periphery of the upper wall 14 and a second portion 20 defined by a combustion bowl wall portion 21 of the upper wall 14. The second portion 20 has a non-planar, undulating surface 22 that depends from the planar first portion 18 and extends along an uppermost surface of the combustion bowl wall portion 21. An undercrown surface 24 is formed on an underside of the combustion bowl wall portion 21 directly opposite the second portion 20 of the upper combustion surface 16. The undercrown 24 is defined here to be the surface of the combustion bowl wall portion 21 that is visible when observing the piston straight on from the bottom, wherein the undercrown surface 24 extends to a distance no more than 2 times the minimum thickness (t, FIG. 3) of the combustion bowl wall portion 21 away from the second portion 20 of the upper combustion surface 16. Accordingly, the undercrown surface 24 is generally form fitting to the second portion 20 of a combustion bowl 26 to provide a minimum distance to the combustion bowl 26, while providing the desired strength, and is substantially contoured to follow the surface on the opposite side from the undulating surface 22 of the combustion bowl wall portion 21. The undercrown surface 24 is openly exposed as viewed from an underside of the piston 10 (FIG. 1), and it is not bounded by an enclosed or partially enclosed cooling gallery feature, such as a floor, or any other features tending to retain oil or a cooling fluid near the undercrown surface 24. Accordingly, as soon as the oil comes into contact with the undercrown surface 24 it is free to fall freely away therefrom, with a fresh supply of oil maintaining cooling contact with the undercrown surface 24 during reciprocating movement of the piston 10 within a cylinder bore.

The annular first portion 18 of the upper wall 14 forms an outer periphery of the upper wall 14 and surrounds an annular combustion bowl 26 that depends therefrom, and thus, the combustion bowl 26 is recessed below the uppermost first portion 18 of the upper combustion surface 16. The combustion bowl 26 is shown as being contoured to provide an upper apex, also referred to as center peak 28, which may lie coaxially along a longitudinal central axis 30 of the piston 10 along which the piston 10 reciprocates in use, or may be radially offset relative to the piston central axis 30, as desired. The top section 13 further forms a ring belt region 32 that depends from the upper combustion surface 16 to provide one or more ring grooves 34 for receipt of one or more corresponding piston rings (not shown), as is common in the construction of pistons.

The piston body 12 further includes a bottom section 36. The bottom section 36 includes a pair of pin bosses 38 depending from the upper section 13 and generally from the upper wall 14. The pin bosses 38 each have a pin bore 40, preferably bushless given the steel construction, wherein the pin bores 40 are laterally spaced from one another coaxially along a pin bore axis 42 that extends generally transversely to the longitudinal central axis 30. The pin bosses 38 have generally flat, radially outermost surfaces, referred to as outer faces 44, shown as being generally parallel with one another. The outer faces 44 are spaced from one another along the pin bore axis 40 a distance PB, wherein the PB dimension is increased as much as possible, as permitted by the novel construction of the piston body 12, without causing any portion of the pin bosses 38 to extend radially beyond an axial projection formed by the outer surface of the upper combustion surface 16, but rather, the PB dimension is provided to bring the outermost surface of the outer faces 44 of the pin bosses 38 flush or substantially flush therewith, thereby minimizing the surface area of an exposed region 46 extending radially outwardly of the pin boss outer faces 44, wherein the exposed region 46 forms an undersurface portion of the ring belt region 32.

The pin bores 40 each have a concave uppermost load bearing surface, referred to hereafter as uppermost bearing surface 48, extending planar or substantially planar with the exposed region 46, and thus, with the undersurface of the ring belt region 32. As a result, the compression height CH is minimized (the compressing height is the dimension extending from the pin bore axis 42 to the upper combustion surface 16, as shown in FIG. 2). The pin bosses 38 are joined via outer panels, also referred to as struts or strut portions 50, to diametrically opposite skirt portions, also referred to as skirt panels 52 of the bottom section 36. The skirt panels 52 and strut portions 50 bound open, unobstructed cavities 54 extending from a lowermost or bottom surface 56 of the strut portions 50 and skirt panels 52 to the undercrown surface 24. The open cavities 54 provide direct access to oil splashing or being sprayed from within the crankcase directly onto the undercrown surface 24, thereby allowing the entire, circumferentially bounded undercrown surface 24 to be splashed directly by oil from within the crankcase, and also allowing the oil to freely splash about the wrist pin (not shown), while at the same time significantly reducing the weight of the piston 10, given no cooling gallery features are present. Accordingly, although not having a typical closed or partially closed cooling gallery, the open configuration of the galleryless piston 10 allows excellent cooling of the undercrown surface 24 and lubrication to the wrist pin joint within the pin bores 40, while at the same time reducing oil residence time (the time in which a volume of oil remains on the a surface) on the surfaces near the combustion bowl 26. This can reduce unwanted build-up of coked oil, such as can occur in pistons having a closed or substantially closed cooling gallery. As such, the piston 10 remains "clean" over extended use, thereby allowing it to remain substantially free of debris build-up, thereby prolonging the useful life of the piston 10 and component parts associate therewith.

In addition to providing excellent cooling to the undercrown surface 24, the increased spacing of the pin bosses 38 from one another, and the increased distance PB, allows the diameter of the wrist pin (not shown) to be minimized, thereby further reducing the compression height CH and weight of the piston 10, while at the same time minimizing the unit loading across the wrist pin/pin bore interface and across the wrist pin/connecting rod interface. The unit loading is defined as the compression load/2-D projected bearing surface area, and with the upper bearing surface 48 being maximized, due to an increased width thereof as a result of the increased distance PB, the unit loading is decreased, thereby minimizing stress and wear of the component parts. Further, with the increased spacing between the pin bosses and the increased distance PB, inner faces 58 of the pin bosses 38 can be spaced further apart, thereby providing increased space for receipt of the small end of the connecting rod, and thereby increasing the openly exposed area of the wrist pin extending between the inner faces 50 and the small end of the connecting rod. As such, enhanced lubrication of the wrist pin joints between the pin bores 40 and the connecting rod can result due to an increased ability to freely splash the expose region of the wrist pin with oil.

In addition to the benefits above, a further benefit provided by the increased spacing of the pin bosses 38 is recognized by being able to increase the circumferential span or arced sector of the skirt panels 52. As can be seen in FIG. 1, the skirt panels 52 extend over an increase circumferential arc such that the outer surface of the skirt panels 52, the strut portions 50 and the pin bosses 38 are nearly circular, in contrast to a much more rectangular shape of a conventional piston. The skirt panels 52 merge with pin bosses via the strut portions 50, and the strut portions 50 are arced and inclined in oblique relation to the pin bore axis 42, thereby forming a smooth arcuate transition between the skirt panels 52 and the sides of the pin bosses 38. With the skirt panels 52 having an increased circumferential span, also referred to as width, the walls of the skirt panels 52 have an increased flexibility relative to more rigid, reduced width skirt panels. The increased flexibility or elastic deformability of the skirt panel walls serves to reduce deformation of the cylinder liner, which in turn enhances the performance of the piston rings (not shown) as a result of reduced deformation of the cylinder liner, thereby reducing the amount of oil "blow by" past the piston rings. Accordingly, the performance of the engine is enhanced and extended over an increased life.

The undercrown surface 24 circumferentially bounded by the skirt portions 52, the strut portions 50 and the pin bosses 38 have an openly exposed projected 2-dimensional surface area, as viewed looking along the central longitudinal axis 30, between about 30-55 percent of an area defined by a maximum outer diameter of the piston body 12, thereby providing an expansive area against which oil being splashed or sprayed can freely come into direct contact therewith to enhance cooling the piston 10 while in use. Further, the undercrown surface 24 bounded by the skirt portions 52, the strut portions 50 and the pin bosses 38 has a total 3-dimensional surface area that is greater than 30 percent of the maximum area of the piston body defined by the maximum outer diameter of the piston body 12, typically defined by the diameter of the uppermost region of the piston 10, and is generally between about 30-90 of the maximum area defined by the maximum outer diameter of the piston body 12.

In FIGS. 4-7, a piston 110 constructed in accordance with another aspect of the invention is shown, wherein the same reference numerals, offset by a factor of 100, are used to identify like features in FIGS. 4-7. One skilled in the art will readily recognize those features not identified by a reference numeral, but being similar to features described and identified with reference numerals above. The piston 110 has substantially the same features as described for the piston 10, and in addition has diametrically opposite, peripherally (outer periphery) enclosed through channels, referred to hereafter as channels 60. The channels 60 extend over upper surfaces 62 of the pin bosses 138 and immediately beneath the upper wall 114, wherein the channels 60 have opposite ends that open into the openly exposed, galleryless region of the undercrown surface 124 that is bounded by the skirt panels 152, the strut portions 150 and the pin bosses 138. Accordingly, it should be recognized that other than the peripherally enclosed, diametrically opposite channels 60, the piston 110 is galleryless, thereby not having any enclosed or partially enclosed chambers or regions, thus, being entirely open and exposed as viewed along a longitudinal central axis 130 of the piston 110.

The peripherally enclosed channels 60 extend immediately adjacent the upper combustion surface 116 between, and in radial alignment with, the combustion bowl 126 and the ring belt region 132. The channels 60 extend immediately adjacent, and are partially bounded by, both a descending portion of the combustion bowl 126 and the ring belt region 132, and span the entirety or substantial entirety of the axial length of ring belt region 132. As such, the channels 60 facilitate cooling these regions, including the combustion bowl rim and the portions of the upper combustion surface 116 in axial alignment with the enclosed channels 60, the regions of the combustion bowl 126 spaced on an opposite sides from the channels 60 by the upper wall 114, and the portions of the ring belt region 132 extending across the pin bosses 138 between the skirt panels 152, as well as the piston rings, which in turn enhances the performance of the piston rings, and further aids in the transfer of heat away from the piston 110 to the cylinder liner. A further benefit is the significant reduction in weight of the piston 110 provided by the hollowed, peripherally enclosed channels 60, while at the same time maintaining a high durability of the piston 110 via the peripheral wall bounding the enclosed channels 60.

An inner wall surface 64 forming the outer periphery bounding the channels 60 can take on any desired contour, such that the inner wall surface 64 can follow the contour of immediately adjacent features, such as the combustion bowl 126, the ring belt region 132 and the pin bores 140. Accordingly, the inner wall surface 64 of the channels 60 can be non-circular, asymmetrical, or any other shaped, as desired, as viewed in axial cross-section, which in turn facilitate cooling and weight reduction by providing a reduced thickness of material for the walls between the channels 60, the combustion bowl 126 and ring belt region 132. This is facilitated by printing, via additive manufacturing processes, or casting the piston 110, such as via lost material casting processes, investment casting, or otherwise. The casting process is facilitated by having direct and open access to open entrance regions 66 of the channels 60 via the neighboring galleryless regions of the undercrown surface 124.

The undercrown surface 124 circumferentially bounded by the skirt portions 152, the strut portions 150 and the pin bosses 138 have an openly exposed projected 2-dimensional surface area, as viewed looking along the central longitudinal axis 130, between about 30-55 percent of an area defined by a maximum outer diameter of the piston body, thereby providing an expansive area against which oil being splashed or sprayed can freely come into direct contact therewith to enhance cooling the piston 110 while in use. Further, the undercrown surface 124 bounded by the skirt portions 152, the strut portions 150 and the pin bosses 138 has a total 3-dimensional surface area that is greater than 30 percent of the maximum area of the piston body defined by the maximum outer diameter of the piston body, typically defined by the diameter of the uppermost region of the piston 110, and is generally between about 30-90 of the maximum area defined by the maximum outer diameter of the piston body.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A piston for an internal combustion engine, comprising:
a monolithic piston body extending along a central longitudinal axis, said piston body having an upper wall forming an upper combustion surface with an annular ring belt region depending from the upper combustion surface for receipt of at least one piston ring, said upper combustion surface having first and second portions, said first portion extending annularly along an outer periphery of said upper wall and said second portion forming a combustion bowl depending radially inwardly from said first portion, said upper wall having an undercrown surface formed on an underside of said combustion bowl directly opposite said second portion;
a pair of skirt portions depending from said ring belt region;
a pair of pin bosses providing a pair of laterally spaced pin bores aligned along a pin bore axis for receipt of a wrist pin, said pin bosses being joined to said skirt portions via strut portions;
said undercrown surface being bounded by said skirt portions, said strut portions and said pin bosses, said undercrown surface having an openly exposed projected 2-dimensional surface area, as viewed looking along said central longitudinal axis, between about 30-55 percent of an area defined by a maximum outer diameter of said piston body; and
said piston body having diametrically opposite, peripherally enclosed channels extending over upper surfaces of said pin bosses and beneath said upper wall, with said enclosed channels opening into said bounded undercrown surface and projecting radially outwardly of outer end faces of said pin bosses.

2. The piston of claim 1 wherein said the undercrown surface bounded by said skirt portions, said strut portions and said pin bosses has a total 3-dimensional surface area that is greater than 30 percent of said area defined by a maximum outer diameter of said piston body.

3. The piston of claim 1 wherein said enclosed channels have a non-circular shape as viewed in axial cross-section.

4. The piston of claim 3 wherein said enclosed channels have an asymmetrical shape as viewed in axial cross-section.

5. The piston of claim 1 wherein said outer peripheries of said skirt portions, said strut portions and said pin bosses extend between about 75-100 percent of the outer circumference of said upper combustion surface.

6. A piston for an internal combustion engine, comprising:
a monolithic piston body extending, said piston body having an upper wall forming an upper combustion surface with an annular ring belt region depending from the upper combustion surface for receipt of at least one piston ring, said upper combustion surface having first and second portions, said first portion extending annularly along an outer periphery of said upper wall and said second portion forming a combustion bowl depending radially inwardly from said first portion, said upper wall having an undercrown surface formed on an underside of said combustion bowl directly opposite said second portion;
a pair of skirt portions depending from said ring belt region;
a pair of pin bosses providing a pair of laterally spaced pin bores aligned along a pin bore axis for receipt of a wrist pin, said pin bosses being joined to said skirt portions via strut portions said pin bosses having axially outwardly facing pin boss end faces;
said undercrown surface being bounded by said skirt portions, said strut portions and said pin bosses and having an openly exposed projected 2-dimensional surface area, as viewed looking along said central longitudinal axis; and
said piston body has diametrically opposite, peripherally enclosed channels extending over upper surfaces of said pin bosses beneath said upper wall as well as radially outwardly of said pin boss end faces, with said channels opening into said openly exposed undercrown surface bounded by said skirt portion, said strut portions and said pin bosses.

7. The piston of claim 6 wherein said enclosed channels have a non-circular shape as viewed in axial cross-section.

8. The piston of claim 6 wherein said openly exposed projected 2-dimensional surface area is between about 30-55 percent of an area defined by a maximum outer diameter of said piston body.

9. The piston of claim 6 wherein said the undercrown surface bounded by said skirt portions, said strut portions and said pin bosses has a total 3-dimensional surface area that is greater than 30 percent of said area defined by a maximum outer diameter of said piston body.

10. The piston of claim 6 wherein said outer peripheries of said skirt portions, said strut portions and said pin bosses extend between about 75-100 percent of the outer circumference of said upper combustion surface.

11. A method of constructing a piston for an internal combustion engine, comprising:
forming a monolithic piston body having an upper wall with an upper combustion surface and an annular ring belt region depending from the upper combustion surface, forming the upper combustion surface having first and second portions, with the first portion extending annularly along an outer periphery of the upper wall and the second portion forming a combustion bowl depending radially inwardly from the first portion, forming an undercrown surface on an underside of the combustion bowl directly opposite the second portion, with at least a portion of the undercrown surface being bounded by diametrically opposite skirt portions, pin bosses and strut portions extending between the skirt portions and the pin bosses, forming the bounded undercrown surface having an openly exposed projected 2-dimensional surface area, as viewed looking along the central longitudinal axis, between about 30-55 percent of an area defined by a maximum outer diameter of the piston body; and
forming the piston body having diametrically opposite, peripherally enclosed channels extending over upper surfaces of the pin bosses and beneath the upper wall, with the channels opening into the openly exposed undercrown surface bounded by the skirt portion, the strut portions and the pin bosses.

12. The method of claim 11 further including forming the undercrown surface bounded by the skirt portion, the strut portions and the pin bosses having a total 3-dimensional surface area that is greater than 30 percent of the area of the piston body.

13. The method of claim 11 further including forming the enclosed channels in a casting process.

14. The method of claim 13 further including casting the enclosed channels having a non-circular shape as viewed in cross-section.

15. The method of claim 14 further including casting the enclosed channels having an asymmetrical shape as viewed in cross-section.

16. The method of claim 11 further including forming the outer peripheries of the skirt portions, the strut portions and the pin bosses extending between about 75-100 percent of the outer circumference of the upper combustion surface.

17. The method of claim 11 further including forming the piston in one of a machining, forging, additive manufacturing, 3-D printing or casting process.

18. A method of constructing a piston for an internal combustion engine, comprising:
forming a monolithic piston body having an upper wall with an upper combustion surface and an annular ring belt region depending from the upper combustion surface, forming the upper combustion surface having first and second portions, with the first portion extending annularly along an outer periphery of the upper wall and the second portion forming a combustion bowl depending radially inwardly from the first portion, forming an undercrown surface on an underside of the combustion bowl directly opposite the second portion, with at least a portion of the undercrown surface being bounded by diametrically opposite skirt portions, pin bosses and strut portions extending between the skirt portions and the pin bosses, forming the bounded undercrown surface having an openly exposed surface area, as viewed looking along the central longitudinal axis, and forming diametrically opposite, peripherally enclosed channels extending over upper surfaces of the pin bosses and beneath the upper wall, with the enclosed channels opening into the bounded undercrown surface and projecting radially outwardly of outer end faces of said pin bosses.

19. The method of claim 18 further including forming the enclosed channels in a casting process.

20. The method of claim 19 further including casting the enclosed channels having a non-circular shape as viewed in cross-section.

21. The method of claim 20 further including casting the enclosed channels having an asymmetrical shape as viewed in cross-section.

22. The method of claim 18 further including forming the bounded undercrown surface having a total 3-dimensional surface area that is greater than 30 percent of the area of the piston body.

23. The method of claim 18 further including forming the bounded undercrown surface having an openly exposed projected 2-dimensional surface area between about 30-55 percent of an area defined by a maximum outer diameter of said piston body.

24. The method of claim 18 further including forming the outer peripheries of the skirt portions, the strut portions and the pin bosses extending between about 75-100 percent of the outer circumference of the upper combustion surface.

25. The method of claim 18 further including forming the piston in one of a machining, forging, additive manufacturing, 3-D printing or casting process.

* * * * *